Jan. 9, 1951
E. T. HANSHAW
2,537,754
SPRING-PROJECTED FISH SPEAR
Filed April 10, 1948
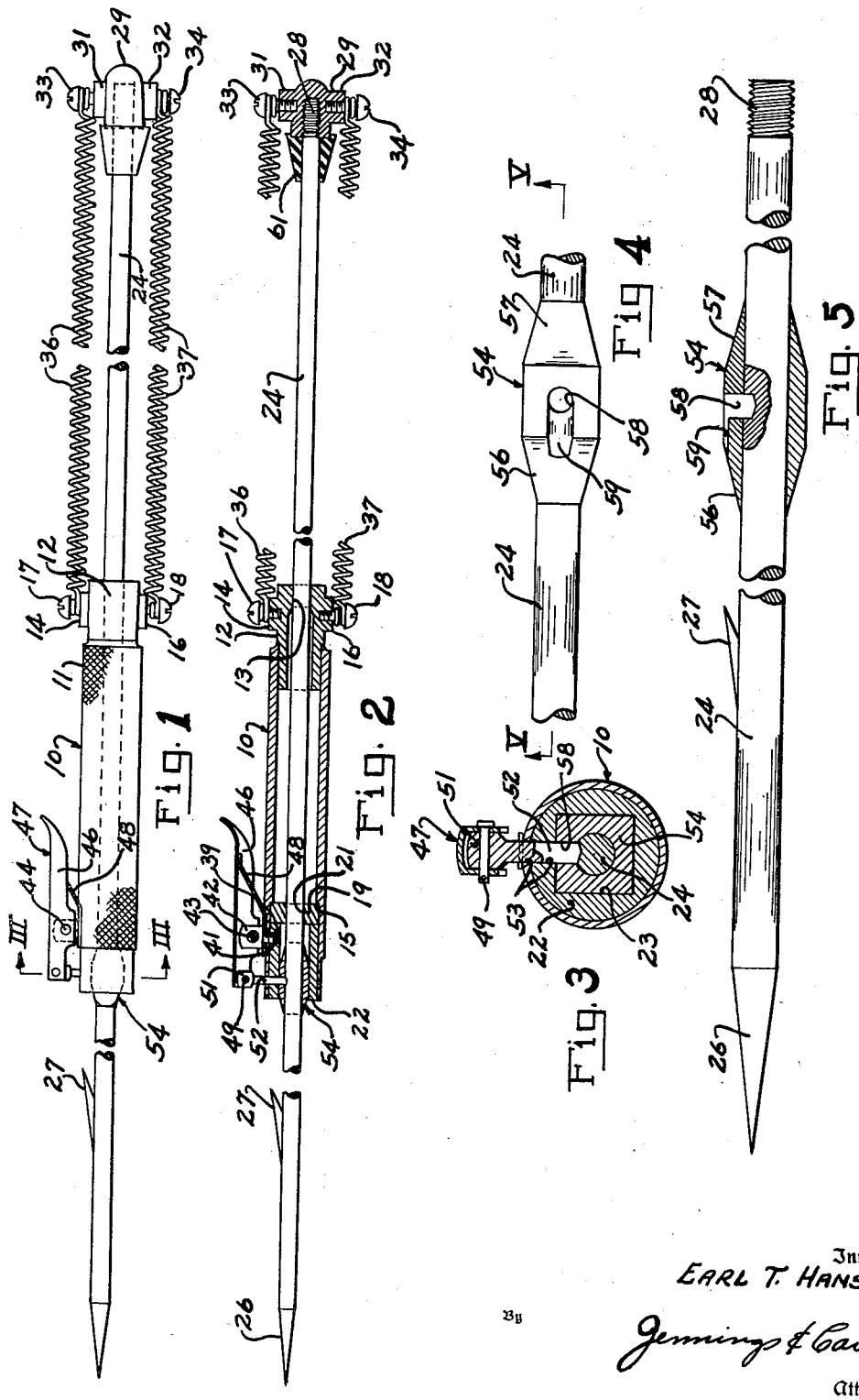
Inventor
EARL T. HANSHAW
By
Jennings & Carter
Attorneys Patented Jan. 9, 1951

2,537,754

UNITED STATES PATENT OFFICE 2,537,754

SPRING-PROJECTED FISH SPEAR

Earl T. Hanshaw, Birmingham, Ala.

Application April 10, 1948, Serial No. 20,181

6 Claims. (Cl. 43—6)

My present invention relates to a fish spearing device of the type having a spring actuated spear, and has for an object the provision of a device of the character designated embodying improved means for locking and releasing the spear for forward thrust.

Another object is to provide a device of the character designated having a tubular handle through which the spear reciprocates, together with a cross head at the rear end of the spear providing means for anchoring the ends of a pair of springs, thereby permitting the use of two relatively light springs instead of a single, relatively large or heavy spring.

A further object is to provide the spear with a square locking portion, having front and rear tapered ends, disposed when the spear is pulled rearwardly against the force of the springs, to fit into a square opening in the forward end of the handle, thereby preventing the springs from becoming twisted, and when so positioned to be engaged by a trigger actuated locking pin.

Further objects are to provide a device of the character designated which shall be simple in construction and light in weight, permitting the same to be used with one hand only; which shall be substantially balanced longitudinally when in cocked position, thus aiding the user in obtaining accurate aim at the prey; and in which the spear is slidable in relatively narrow front and rear bearings disposed in the handle, thus assuring freedom and accuracy of axial movement of the spear through the handle, even though the spear becomes bent during use.

Apparatus embodying the features of my invention is illustrated in the accompanying drawings forming a part of this application in which—

Fig. 1 is a side elevational view of the device partly broken away and in section;

Fig. 2 is a longitudinal sectional view with certain parts broken away;

Fig. 3 is a detail sectional view taken generally along line III—III of Fig. 1;

Fig. 4 is a fragmental plan view illustrating the locking element carried by the spear; and Fig. 5 is a detail sectional view taken generally along line V—V of Fig. 4 and extended to show the point of the spear.

Referring now to the drawings for a better understanding of my invention, my improved device comprises a tubular handle 10 which may be knurled on the outer surface thereof as indicated at 11. Pressed and sweated into the rear end of the handle 10 is a bushing 12 having a centrally disposed opening 13 therein forming the rear bearing for the spear as will be explained. The bushing 12 carries a pair of diametrically opposed bosses 14 and 16, each of which is drilled and tapped to receive screws 17 and 18.

The front end of the handle is bored out to provide an annular shoulder 15. Pressed into the bore and abutting the shoulder 15 is a bushing 19 having a centrally disposed opening 21 forming the front bearing for the spear proper. Forwardly of the bushing 19 I press into the bore of the handle 10 a bushing 22. As best shown in Fig. 3 of the drawing, the bushing 22 is provided with a centrally disposed opening 23, square in transverse cross section.

Slidably mounted in the openings 13 and 21 of the front and rear bushings 19 and 12 is a spear 24 which may be in the form of a round rod. The point of the spear is sharpened as indicated at 26, and rearwardly of the point 26 is a barb 27. I preferably secure the barb 27 several inches to the rear of the point of the spear in order that the point may be sharpened without interference from the barb. The rear end of the spear is threaded as indicated at 28 to receive a cross head 29. The cross head 29 is provided with a pair of diametrically opposed bosses 31 and 32, drilled and tapped to receive a pair of screws or the like 33 and 34.

A pair of coil springs 36 and 37 is anchored at either end to the screws 17—33 and 18—34 and provide power for thrusting the spear forward in the manner to be explained. The springs 36 and 37 may be relatively light in weight and may be pre-stretched to prevent stacking of the coils when the spear is released for forward movement.

The forward end of the handle 10 and the bushing 22 are drilled and tapped as indicated at 39 to receive the threaded shank 41 of a pivot post 42. The head of the pivot post is cross drilled at 43 to receive a pintle 44.

Pivotally mounted on the pintle 44 are the depending side flanges 46 of a trigger 47. The rear end of the trigger 47 is biased upwardly by means of a small leaf spring 48, held in place by the post 42. Pivotally mounted on a pin 49 at the front end of the trigger is the head 51 of a locking pin 52. The handle 10 and the bushing 22 are drilled as indicated at 53 to pass the pin 52.

Secured to the spear 24 is a sleeve 54, square in transverse cross section, and tapered on all four sides at its front and rear ends 56 and 57, respectively. On one side and at its longitudinal center the sleeve 54 is provided with a hole 58 of a size to receive the rounded locking pin 52. Extending forwardly from the hole 58 is a guiding groove 59 in which the end of the pin 52 engages in the event the spear is drawn rearwardly past the locking pin when cocking the device.

From the foregoing, the method of constructing and using my improved fishing spear will be readily understood. With the parts assembled as shown in the drawings, the user grasps the handle 10 in one hand and, grasping the spear forwardly of the handle pulls the spear to the rear against the force of the springs 36 and 37. As the sleeve 54 moves rearwardly, it enters the square opening 23 of the bushing 22, the tapered rear end 57 thereof aiding the entry into the opening. The inner end of pin 52 rides up the tapered end 57 of the sleeve and consequently is forced into the hole 58 in the sleeve by the spring 48. With the device thus cocked, the user holds the handle 10 in one hand, with the trigger in position to be actuated, either by the thumb or the index finger, leaving his other hand free for swimming. It will be apparent that upon movement of the rear end of the trigger 47, toward the handle, pin 52 is drawn from the opening 58 permitting the spear 24 to be thrust forwardly by the springs 36 and 37. To absorb the shock of the cross head striking the bushing 12, I may interpose a rubber cushion 61 at the end of the spear adjacent the cross head.

It will be apparent that the coaction of the square sleeve 54 and the opening 23 in the bushing 22 assures that the hole 58 is in proper alignment for the pin 52 to enter therein when the device is cocked. Further, these elements prevent cocking the device with the springs 36 and 37 twisted with respect to the spear 24, assuring that the force of the springs is exerted solely to thrusting the spear forwardly. The tapered front end 56 of the sleeve permits the locking pin to ride up on the sleeve in the event the spear is drawn too far rearwardly when cocking the same.

It is to be noted that the bearings formed by the bushings 12 and 19 are relatively short in length, and that the portion of the spear in the handle 10 between these bushings is unsupported in bearings. This permits the spear to function smoothly even though the same has become slightly bent in use.

While the device may be made in various sizes, I prefer to make the spear of such length and to position sleeve 54 thereon in such a position that when cocked the spear is substantially balanced longitudinally. This assures accuracy in aiming and reduces fatigue of the user's hand.

From the foregoing it will be apparent that I have devised an improved fish spearing device which is simple of construction, positive in operation, which is provided with means to prevent the device being cocked with the springs twisted, and which is light in weight and accurate in performance. In actual practice, I have found that a device made in accordance with my invention is satisfactory in every way and that the particular type of trigger and lock mechanism for holding the spear in cocked position adds considerably to the safety and ease of operation of the device.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a fishing device, a tubular handle, bearings adjacent the front and rear ends of the handle in which the spear is slidably mounted, a cross head on the rear end of the spear, a pair of tension springs connected at one end to the handle and at the other end to the cross head, there being an opening square in cross section at the forward end of the handle, a locking sleeve on the spear square in cross section disposed when the spear is retracted with respect to the handle to enter said square opening, and trigger mechanism pivotally mounted at the forward end of said handle having a spring biased pin removably engageable with the locking sleeve to hold the spear retracted against the force of the tension springs.

2. Apparatus as defined in claim 1 in which the sleeve is tapered on all four sides at the rear end thereof, thereby to guide the sleeve into said square opening.

3. In a fishing device, a tubular handle, bearings adjacent the front and rear ends of the handle, a spear slidably mounted in the bearings, a cross head on the rear end of the spear, a pair of tension springs each connected at one end to the handle and at the other end to the cross head, a bushing in the front end of the handle forwardly of the front bearing, there being an opening in the bushing square in transverse cross section, a locking sleeve carried on the spear square in cross section and disposed when the spear is retracted with respect to the handle to enter the bushing, there being an opening in the sleeve, a trigger pivotally mounted on the handle adjacent the front end thereof, a locking pin pivotally mounted on the trigger forwardly of the pivot point thereof and adapted to enter the opening in the sleeve, and a spring between the trigger and the handle disposed to urge the rear end of the trigger away from the handle.

4. A fishing device as defined in claim 3 in which the front and rear bearings are relatively short in length and in which the spear is unsupported in the handle between said bearings.

5. A fishing device as defined in claim 3 in which a resilient shock absorbing member is disposed around the spear adjacent the cross head.

6. In a fishing device, a tubular handle, a bushing secured in the rear end of the handle and projecting rearwardly therefrom, there being a centrally disposed opening in the bushing forming a rear bearing for slidably receiving a spear, a second bushing in the handle adjacent the front end bored to provide a front bearing for slidably receiving a spear, a third bushing secured in the handle forwardly of the second bushing, there being a centrally disposed opening in the third bushing square in transverse cross section, a spear slidably mounted in the bearings, a locking sleeve on the spear square in transverse cross section disposed to fit slidably in said square opening, an opening in one face of the sleeve, a headed stud passing through the handle and into the third bushing, a trigger pivotally mounted on the head of the stud, a leaf spring interposed between the head of the stud and the handle and disposed to urge the forward end of the trigger toward the handle, a locking pin pivotally mounted on the forward end of the trigger and disposed to engage in the opening in the face of the locking sleeve, a cross head on the rear end of the spear, and a pair of tension springs connected at one end to the cross head and at the other end to the rearwardly projecting end of the first named bushing.

EARL T. HANSHAW.

REFERENCES CITED

The following references are of record in the file of this patent:

UNITED STATES PATENTS

| Number | Name | Date |
|---|---|---|
| 899,448 | Grobl | Sept. 22, 1908 |
| 970,018 | Coleman | Sept. 13, 1910 |
| 1,009,553 | Neuman | Nov. 21, 1911 |
| 1,107,586 | Burnam | Aug. 18, 1914 |
| 1,506,068 | Lange | Aug. 26, 1924 |
| 1,704,810 | Sperry | Mar. 12, 1929 |
| 2,442,974 | Frederiksen | June 8, 1948 |
| 2,462,248 | Zbar | Feb. 22, 1949 |